(12) United States Patent
Heubel et al.

(10) Patent No.: US 8,593,409 B1
(45) Date of Patent: Nov. 26, 2013

(54) METHOD AND APPARATUS FOR PROVIDING HAPTIC FEEDBACK UTILIZING MULTI-ACTUATED WAVEFORM PHASING

(75) Inventors: Robert W. Heubel, San Leandro, CA (US); Ryan Steger, Sunnyvale, CA (US); Muge Bakircioglu, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 987 days.

(21) Appl. No.: 12/249,362

(22) Filed: Oct. 10, 2008

(51) Int. Cl.
*G06F 3/041* (2006.01)

(52) U.S. Cl.
USPC .................... 345/173; 340/407.1; 345/156

(58) Field of Classification Search
USPC ............. 345/156–184; 178/18.03–18.11; 340/407.1, 407.2
See application file for complete search history.

(56) References Cited

U.S. PATENT DOCUMENTS

| | | | |
|---|---|---|---|
| 5,541,372 A | 7/1996 | Baller et al. | |
| 5,543,588 A | 8/1996 | Bisset et al. | |
| 5,942,733 A * | 8/1999 | Allen et al. | 178/18.01 |
| 6,337,678 B1 | 1/2002 | Fish | |
| 6,429,846 B2 | 8/2002 | Rosenberg et al. | |
| 6,535,201 B1 * | 3/2003 | Cooper et al. | 345/173 |
| 6,639,582 B1 * | 10/2003 | Shrader | 345/156 |
| 6,819,312 B2 | 11/2004 | Fish | |
| 7,205,981 B2 | 4/2007 | Cunningham | |
| 8,022,933 B2 * | 9/2011 | Hardacker et al. | 345/169 |
| 8,378,797 B2 * | 2/2013 | Pance et al. | 340/407.2 |
| 2002/0054060 A1 | 5/2002 | Schena | |
| 2003/0117371 A1 * | 6/2003 | Roberts et al. | 345/156 |
| 2005/0030292 A1 | 2/2005 | Diederiks | |
| 2005/0040962 A1 | 2/2005 | Funkhouser et al. | |
| 2006/0143342 A1 * | 6/2006 | Kim et al. | 710/73 |
| 2007/0182718 A1 * | 8/2007 | Schoener et al. | 345/173 |
| 2008/0068334 A1 | 3/2008 | Olien et al. | |
| 2008/0122315 A1 * | 5/2008 | Maruyama et al. | 310/314 |
| 2008/0132313 A1 * | 6/2008 | Rasmussen et al. | 463/16 |
| 2008/0231610 A1 * | 9/2008 | Hotelling et al. | 345/173 |
| 2009/0213066 A1 * | 8/2009 | Hardacker et al. | 345/156 |
| 2010/0079264 A1 * | 4/2010 | Hoellwarth | 340/407.2 |
| 2010/0160016 A1 * | 6/2010 | Shimabukuro et al. | 463/16 |
| 2011/0012717 A1 * | 1/2011 | Pance et al. | 340/407.2 |
| 2012/0162113 A1 * | 6/2012 | Lee | 345/173 |

OTHER PUBLICATIONS

TactaPad: www.tactiva.com, 6 pages.

* cited by examiner

*Primary Examiner* — Dmitriy Bolotin
(74) *Attorney, Agent, or Firm* — Pillsbury Winthrop Shaw Pittman LLP

(57) ABSTRACT

A method and device for generating haptic feedback over a touch surface using multi-actuated waveform phasing are disclosed. A haptic device, in one embodiment, includes a touch surface and a group of haptic actuators. The touch surface is capable of sensing an event, wherein the event can be a contact on the touch surface or a movement nearby the surface. A portion of the haptic actuators, which are coupled to the touch surface, is configured to provide haptic feedback on the touch surface in response to the event. Another portion of the haptic actuators is used to minimize unwanted haptic effect on the touch surface.

22 Claims, 13 Drawing Sheets

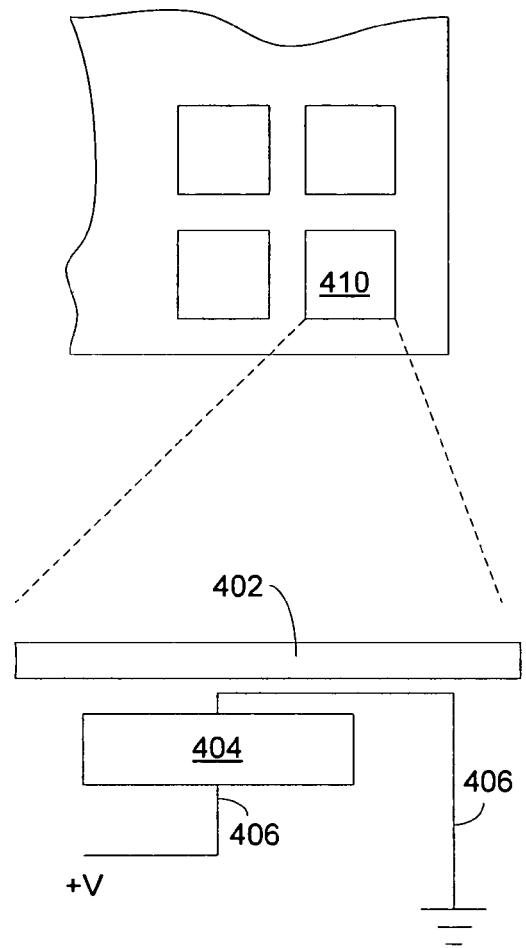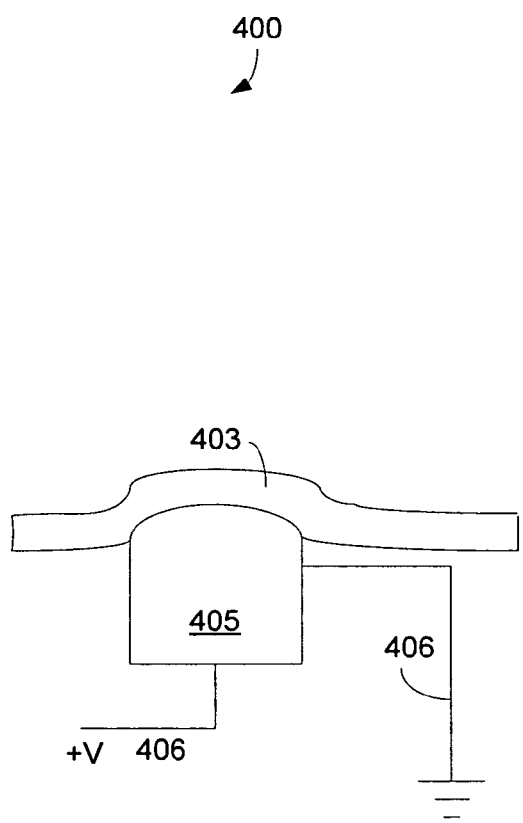
FIG 4(a)
FIG 4(b)

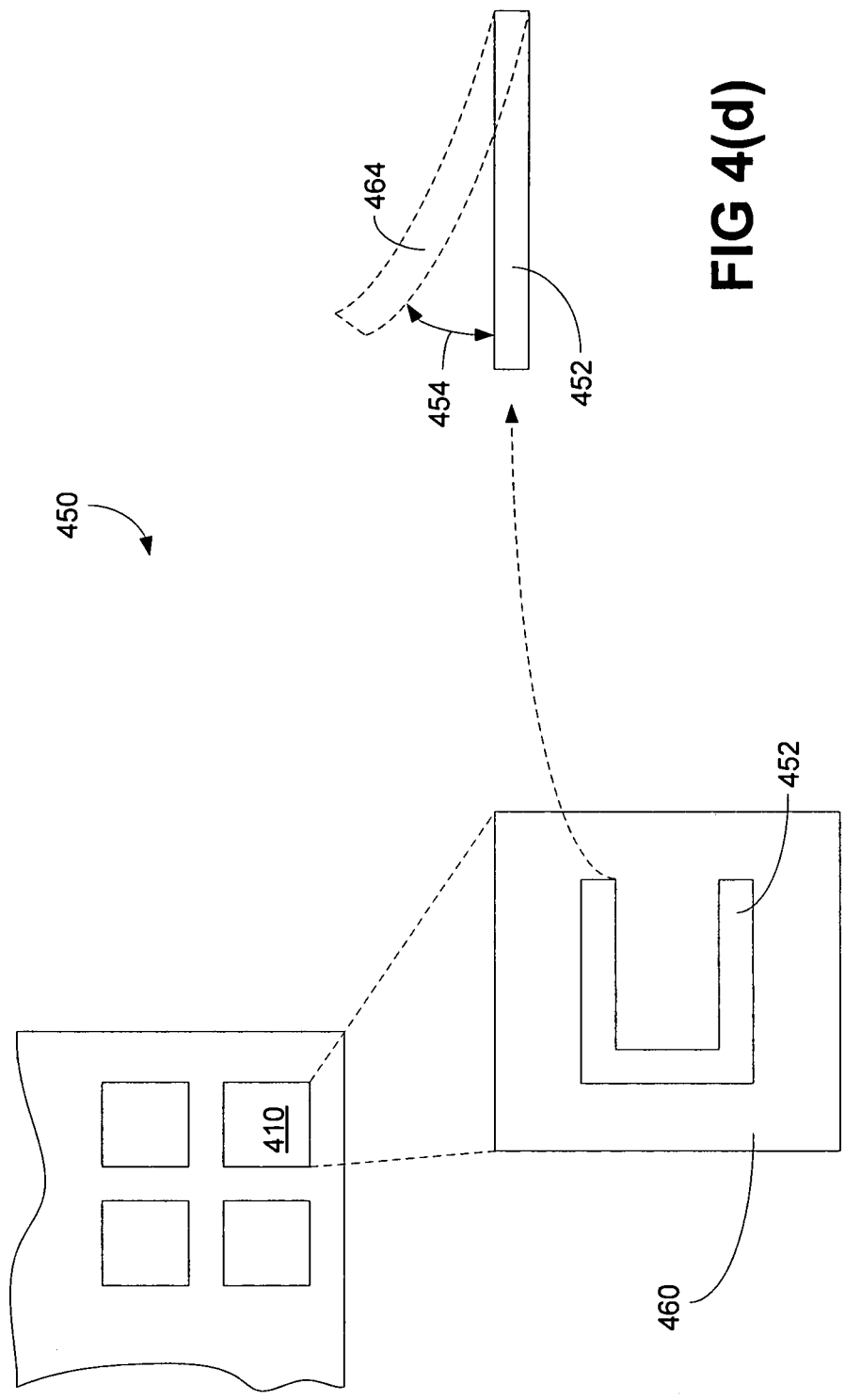

METHOD AND APPARATUS FOR PROVIDING HAPTIC FEEDBACK UTILIZING MULTI-ACTUATED WAVEFORM PHASING

RELATED APPLICATIONS

This application is related to the following co-pending applications, each assigned to the Assignee of the present invention.

a. application Ser. No. 11/823,192, filed Jun. 26, 2007, entitled "Method and Apparatus for Multi-touch Tactile Touch Panel Actuator Mechanisms";

b. application Ser. No. 11/823,258, filed Jun. 26, 2007, entitled "Method and Apparatus for Multi-touch Haptic Touch Panel Actuator Mechanisms"; and c. application Ser. No. 11/943,862, filed Nov. 21, 2007, entitled "Method and Apparatus for Providing a Fixed Relief Touch Screen with Locating Features Using Deformable Haptic Surfaces."

d. application Ser. No. 12/061,463, filed Apr. 2, 2008, entitled "Method and Apparatus for Providing Multi-Point Feedback Texture Systems."

FIELD

The exemplary embodiment(s) of the present invention relates to a field of electronic interface devices. More specifically, the exemplary embodiment(s) of the present invention relates to generation of haptic feedback.

BACKGROUND

As computer-based systems, appliances, automated teller machines (ATM), point of sale terminals and the like have become more prevalent in recent years, the ease of use of the human-machine interface is becoming more important. Such interfaces should operate intuitively and require little or no user training whereby they may be employed by virtually anyone. Many conventional user interface devices are available on the market, such as key boards, mouse, joysticks, and touch screens. One of the most intuitive and interactive interface devices known is the touch panel, which can be a touch screen or a touch pad. A touch screen includes a touch sensitive input panel and a display device, and provides a user with a machine interface through a panel sensitive to the user's touch and displaying content that the user "touches." A conventional touch pad is a small planar rectangular pad, which can be installed near a display, on a computer, an automobile, ATM machines, and the like.

A conventional touch sensitive panel, for instance, usually has a smooth flat surface and uses sensors such as capacitive sensors and/or pressure sensors to sense locations being touched by a finger(s) and/or an object(s). A user, for example, presses a region or a point on a typical touch screen with a fingertip to emulate a button press and/or moves his or her finger on the panel according to the graphics displayed behind the panel on a display device.

A problem associated with a smooth flat surface touch screen is that it feels flat and smooth when a user touches the screen even though the image behind the surface shows an object such as a button. A conventional approach to compensate for flat and smooth touch feeling is to use haptic responses. To generate haptic responses that emulate an object such as a button, typical mechanical actuators or carriers, for instance, can be used to provide a virtual object or a barrier sensation.

A drawback associated with the conventional approach for generating haptic response is that it relies on global motion of a mechanical carrier attached to the touch screen. Another drawback associated is that it is often difficult to generate clear or crisp haptic responses.

SUMMARY

A haptic mechanism capable of generating haptic feedback over a touch surface using multi-actuated waveform phasing is described. The haptic device, in one embodiment, includes a touch surface and a group of haptic actuators. The touch surface is capable of sensing an event, wherein the event can be a contact on the touch surface or a movement nearby the touch surface. A portion of the haptic actuators, which are coupled to the touch surface, is configured to provide haptic feedback on the touch surface in response to the event. Another portion of the haptic actuators is used to minimize unwanted haptic responses on the touch surface.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

FIGS. 4(a-d) illustrate examples of haptic cells in a haptic device employing piezoelectric materials and Micro-Electro-Mechanical Systems ("MEMS") elements in accordance with one embodiment of the present invention;

DETAILED DESCRIPTION

Exemplary embodiments of the present invention are described herein in the context of a method, system and apparatus for providing haptic feedback from multi-actuated waveform phasing using perimeter actuators.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

An embodiment(s) of the present invention discloses a haptic device, which is capable of generating haptic feedback over a touch surface using multi-actuated waveform phasing. The device includes a touch surface and a group of haptic actuators, wherein the touch surface is capable of sensing an event. The event, for instance, can be a contact with the touch surface or a movement nearby the device. A portion of the haptic actuators coupled to the touch surface is used to provide haptic feedback in response to the event. Another portion of the haptic actuators is used to minimize unwanted haptic responses on the touch surface.

Figure 1A:
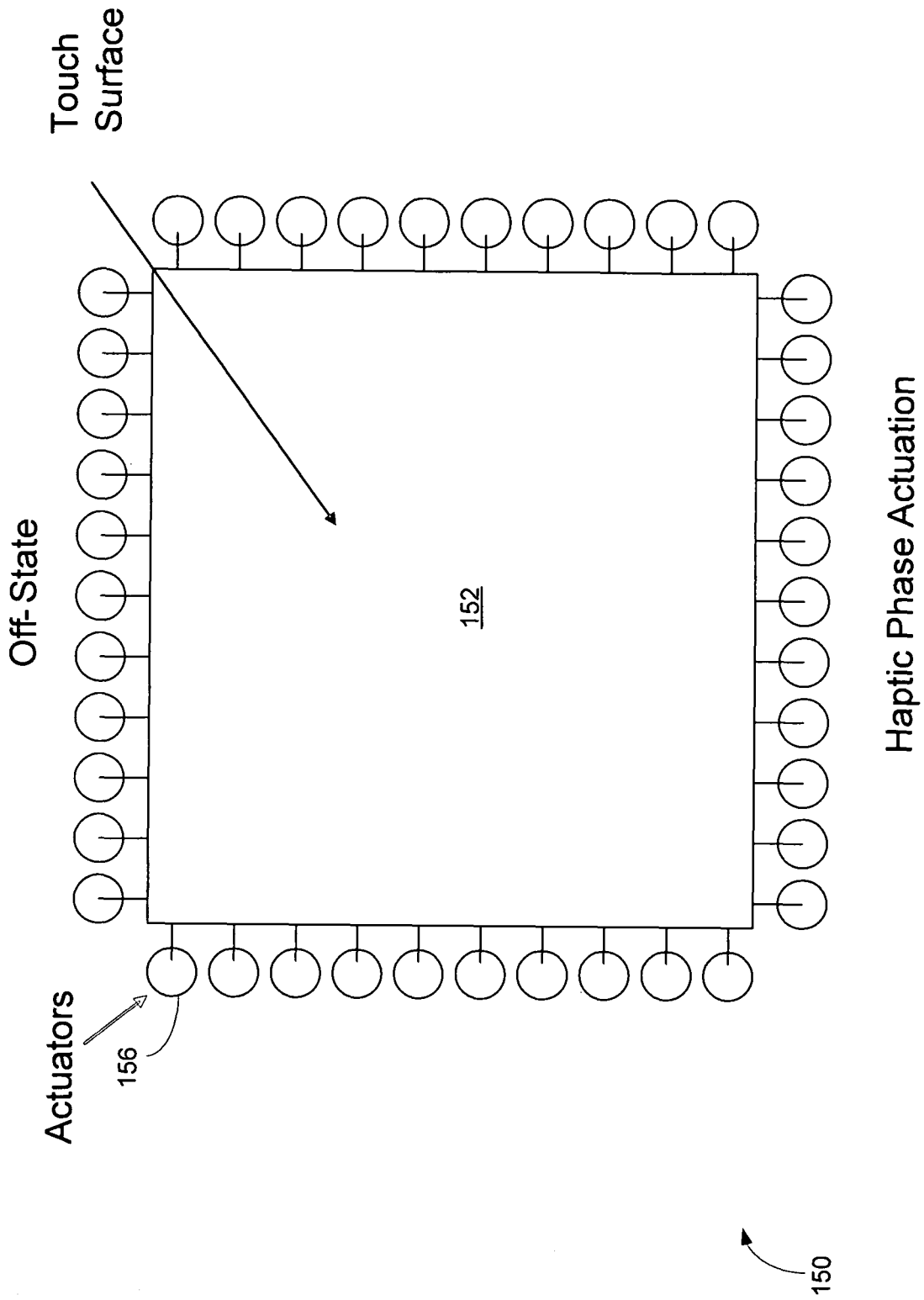
FIGS. 1(a-b) illustrate haptic devices capable of generating haptic feedback using multi-actuated waveform phasing in accordance with one embodiment of the present invention.

FIG. 1(a) illustrates a haptic device 150 capable of generating haptic feedback utilizing multi-actuated waveform phasing in accordance with one embodiment of the present invention. Device 150 includes a touch surface 152 and a group of actuators 156 capable of providing haptic feedback using haptic phase actuation. Actuators 156 are coupled to the perimeter of touch surface 152. Touch surface 152 is also known as touch pad, haptic layer, touch sensitive surface, flexible touch sensitive surface, or the like. It should also be noted that the underlying concept of the exemplary embodiment of the present invention would not change if one or more blocks (circuits or layers) were added to or removed from device 150.

Touch surface 152, in one aspect, includes a detecting mechanism capable of sensing an event. The event can be, but not limited to, a surface contact, a movement, an ambient condition, a sound, an optical light, and the like. The ambient condition includes surrounding temperature, light, humidity, radiation, et cetera. For instance, a surface contact has occurred when a depression on the touch surface happens via a push by a user's finger. Alternatively, a contact can be made by a pointed object, such as a stylus or a pen.

Touch surface 152, in one embodiment, is made of flexible soft material wherein the medium of the flexible soft material is able to transmit haptic waves from a wave-generating source such as actuators 156 to wave-destination such as the contact location. For example, the touch surface 152 may be made of gel-like synthetic polymers or natural substances. The medium of gel-like polymers facilitates the travel of the haptic waveform from a wave-source to a wave-destination via the gel-like polymer or semi-liquid medium.

Device 150 also includes a haptic sensor or a controller, not shown in FIG. 1(a), capable of determining physical location of an event, also known as the location of the interaction on touch surface 152. The haptic sensor, in one embodiment, is capable of calculating a distance for every actuator between its location and the location of interaction. Upon detecting multiple interactions or events, the haptic sensor is configured to calculate distances between each actuator and the multiple locations of interactions. It should be noted that the haptic sensor or controller can be a part of touch surface 152. Alternatively, the haptic sensor can be distributed across one or more actuators 156. The calculated distances between actuators and location(s) are used by actuators 156 for generating haptic feedback as well as haptic phase actuation for canceling unwanted haptic responses. It should also be noted that the haptic sensor does not require the user to have direct contact with the touch surface before making its calculations for haptic responses.

Actuators 156, in one embodiment, are physically located at the perimeter of touch surface 152. It should be noted that depending on applications, additional actuators may be placed below or above touch surface 152. Alternatively, actuators 156 can also be situated in one side, two sides, or three sides of the perimeter of touch surface 152. Actuators 156, in one embodiment, work in harmony or in synchrony to intensify the haptic feedback. A portion of haptic actuators 156 is allocated to provide haptic feedback to touch surface 152 in response to the event while another portion of haptic actuators 152 is used to minimize unwanted haptic effect on touch surface 152. For example, while some actuators 156 located at the perimeter of touch surface 152 send haptic waves to an interactive point or location of the interaction, other actuators 156 emit actuations to cancel unwanted actuation waves.

To intensify haptic feedback at the interaction, various haptic waves generated by a group of actuators 156 arrive at the location of the interaction on touch surface 152 at the same time or substantially the same time. Since the distance between each actuator 156 and the location of interaction can be different, time to activate haptic wave for each actuator 156 is independent from its neighboring actuators thereby all of the haptic waves for generating haptic feedback can arrive at the same time. Similarly, to improve haptic feedback, various haptic actuations generated by another group of actuators 156 are used to cancel unwanted haptic waveforms, unwanted vibrations, or unwanted actuations across touch surface 152. In one embodiment, actuators are also capable of generating haptic feedback to support multiple interactions in response to multiple touch events. It should be noted that actuators 156 may include one or more of the same or different types of haptic elements, such as fibers (or nanotubes) of electroactive polymers ("EAP"), piezoelectric elements, fiber of shape memory alloys ("SMAs"), plasma actuators, pneumatic actuators, electric actuators, motors, hydraulic cylinders, linear actuators, and the like.

Multi-actuated waveform phasing across the entire surface of touch surface 152 creates areas of greatest haptic actuation(s) at one or more touch points while canceling or reducing any perceived actuations in other areas of touch surface 152. Touch surface 152 can be actuated through the use of a gel material having aquatic-like or paste-like medium by injecting energy into the medium in a controlled manner thereby various waveforms are produced. An advantage of using the haptic phase actuation for a multi-point touch system is that a user(s) can feel two distinctly different haptic responses in different areas of a touch surface without one response bleeding over into another response. For example, for a touch surface capable of simulating both texture and objects, when a user drags two fingers across the touch surface, he or she can feel a haptic texture with one finger and a haptic virtual button with another finger. It should be noted that haptic sensation (or response) at the location of the virtual button response is stronger than haptic sensation at the location of haptic texture.

When a point of contact on touch surface 152 is detected, haptic generators or actuators 156 react in combination to initiate haptic waveform pulses directly to the point of contact location with the intent of causing waveforms to collide, which renders haptic sensation at the point of contact(s). At the same time, other actuators 156 send canceling haptic pulses (waveforms) to eliminate or minimize any unwanted haptic responses or effects.

Actuators 156, in one embodiment, are capable of providing kinesthetic feedback and/or tactile feedback, which are also known as haptic feedback. The kinesthetic feedback can be active and resistive force feedback while tactile feedback can be vibration, texture, and heat. Haptic feedback, for example, provides texture sensation in touch surface as well as cues that enhance and simplify user interface, such as virtual button interaction confirmations.

Device 150 is capable of generating haptic waves or pulses with varying frequencies, amplitudes, and durations, which allow different textures and/or haptic objects to be emulated. The texture(s) can be either across the whole touch surface or in a distinct area. In an alternative embodiment, a multi-point touch system provides multiple emulated textures simultaneously over different regions of touch surface 152. For example, a user dragging two fingers across touch surface 152 may feel different textures on each finger. Furthermore, while simulated textures are being produced, device 150 can also provide virtual interfaces or objects, such as buttons, switches, or sliders. Virtual objects can be emulated by generating shorter and stronger confirming haptic responses initiated by haptic generators 156.

In operation, a capacitive sensing circuit may be used to predetermine the intended location(s) of the touch interaction before a user touches touch surface 152. The predetermination allows device 150 to identify which haptic actuator or generator(s) should be triggered with what amplitude and/or frequencies. The predetermination also provides an order to trigger generators 156 to increase haptic response at the touch point(s). In addition, some generators 156 are configured to provide phase actuation to eliminate or reduce unwanted haptic effect outside of the location(s). It should be noted that the underlying concept of the present invention does not change if other sensing technology, which provides similar sensing capabilities and/or functions as described-above, to predetermine the location(s) of the touch interactions.

Figure 1B:
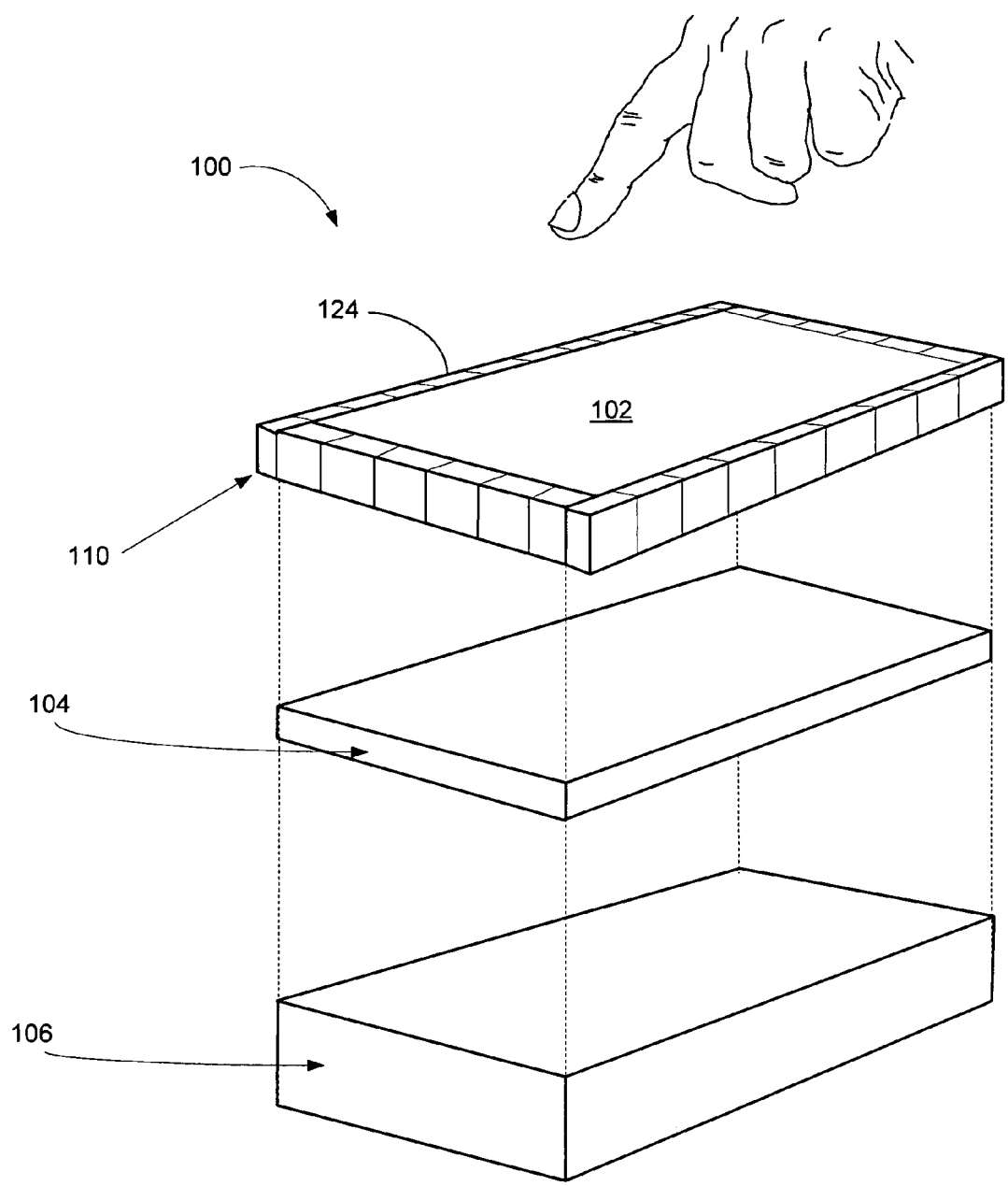

FIG. 1(b) is a perspective diagram 100 illustrating a haptic device capable of generating vibrotactile feedback using haptic phase actuation or multi-actuated waveform phasing in accordance with one embodiment of the present invention. Diagram 100 illustrates a touch sensitive panel or touch surface 110, a display panel 104, and a case 106. Touch sensitive panel 110, in one example, is made of substantially transparent material, and is capable of transmitting light whereby objects or images displayed in display 104 can be seen through touch sensitive panel 110. Display 104 can be any type of display such as a cathode ray tube (CRT), liquid crystal display (LCD), plasma display, flat panel display, flexible display or the like. Both touch sensitive panel 110 and display 104 may be installed together with case 106 and/or integrated into the same unit or device. In some applications, display 104 may be removed from the haptic device when displaying images are not necessary. For example, a touch pad used on a laptop or on a vehicle dashboard, which does not require displaying images, can be opaque. It should be further noted that the underlying concept of the exemplary embodiment of the present invention would not change if one or more blocks (circuits or layers) were added to or removed from diagram 100.

Touch sensitive panel 110 includes a touch surface 102 and a group of actuators or generator 124. In one embodiment, panel 110 also includes an insulated layer or a protective layer, not shown in FIG. 1(b), on top of panel 110 providing device protection. Actuators 124 form a ring of actuators physically situated around the four sides of the perimeter of touch surface 102. Alternatively, actuators 124 can form a U-shaped formation connecting three sides of touch surface 102. In another embodiment, actuators 124 can form an L-shaped configuration connecting two sides of touch surface 102. Each haptic actuator or cell 124 is capable of providing a haptic effect in response to an input. When multiple contacts are depressed on touch surface 102 simultaneously, touch sensitive panel or touch panel 110 activates haptic actuators 124 to generate multiple haptic feedbacks in response to the multiple contacts. It should be noted that the multiple contacts may be made by one finger, multiple fingers, or pointed objects such as a stylus. The dimension or size of each of haptic areas can be configured to be less than 5 mm by 5 mm (millimeters), although other sizes can be used as appropriate. Touch panel 110 accepts a user's selection(s) when one or more touches are made or depressed by user's finger(s).

Touch panel 110 can also include other circuits together with actuators 124 mounted at the edge or otherwise attached to the panel via a cable or flexible circuit. Circuits may be used to provide digital control signals and/or a power source to actuators 124. Case 106 can also include a digital processing unit for data, analog, and/or mixed signal processing. Haptic actuators 124 are configured to work in harmony to generate crisp vibrotactile or kinesthetic feedback through haptic phase actuation. It should be noted that the haptic actuators 124 do not necessarily cover the entire edge of touch surface 102. The layout of haptic actuator 124 can be selectively configured to meet the requirements of a particular application.

Flexible surface layer 102, in one instance, is made of soft and/or elastic materials such as silicone rubber, which is also known as polysiloxane. A function of the flexible surface layer 102 is to change its surface shape or texture to emulate a specific texture or objects such as buttons or barriers. It should be noted that the deformation of flexible surface layer 102 from one texture to another, for example, is controlled by the actuators 124. For example, when actuators 124 are not activated, flexible surface layer 102 maintains its smooth configuration. The surface configuration of flexible surface layer 102, however, deforms or changes from a smooth configuration to a coarse configuration when actuators 124 are activated.

Alternatively, flexible surface layer 102 is a flexible touch sensitive surface, which is capable of accepting user inputs. The flexible touch sensitive surface can be divided into multiple regions wherein each region of the flexible touch sensitive surface can accept an input when the region is being touched or depressed by a finger or a stylus. In one embodiment, the flexible touch sensitive surface includes a sensor, which is capable of detecting a nearby finger and waking up, or turning on, the device. Flexible surface layer 102 may also include a flexible display, which is capable of deforming together with flexible surface layer 102. It should be noted that various flexible display technologies can be used to manufacture flexible displays, such as organic light-emitting diode (OLED), organic, or polymer TFT (Thin Film Transistor).

Haptic actuator 124 can also be referred to as a haptic mechanism, a haptic generator, a haptic layer, a tactile element, and the like, and are operable to provide haptic feedback in response to an activating command or signal. Actuators 124 provide multiple tactile or haptic feedbacks wherein one tactile feedback is used for surface deformation, while another tactile feedback is used for input confirmation. Input confirmation is a haptic feedback informing a user about a selected input. For example, actuators 124 can be implemented by various techniques including vibration, vertical displacement, lateral displacement, push/pull technique, air/fluid pockets, local deformation of materials, resonant mechanical elements, piezoelectric materials, micro-electromechanical systems ("MEMS") elements, thermal fluid pockets, MEMS pumps, variable porosity membranes, laminar flow modulation, or the like.

Haptic actuators 124, in one embodiment, can be constructed by flexible, semi-flexible, semi-rigid, or rigid materials. For example, actuators 124 may be constructed with fibers (or nanotubes) of EAP, piezoelectric elements, fiber of SMAs or the like. EAP, also known as biological muscles or artificial muscles, is capable of changing its shape in response to an application of voltage. The physical shape of an EAP may be deformed when it sustains large force. EAP may be constructed with electrostrictive polymers, dielectric elastomers, conducting polymers, ionic polymer metal composites, responsive gels, bucky gel actuators, or a combination of the above-mentioned EAP materials.

SMA, also known as memory metal, is another type of material which can be used to construct haptic actuator 124. SMA may be made of copper-zinc-aluminum, copper-aluminum-nickel, nickel-titanium alloys, or a combination of copper-zinc-aluminum, copper-aluminum-nickel, and/or nickel-titanium alloys. A characteristic of SMA is that when its original shape is deformed, it regains its original shape in accordance with the ambient temperature and/or surrounding environment. It should be noted that the present embodiment may combine the EAP, piezoelectric elements, and/or SMA to achieve a specific haptic sensation.

Upon receipt of a first activating signal, a sensor or controller calculates a distance for every actuator indicating a waveform traveling distance between a touch point (or an interaction location) and an actuator. Some actuators are activated to intensify haptic feedback at the touch spot while other actuators are activated to minimize unwanted actuations across touch surface 102. If multiple touch spots are determined, a more sophisticated computation is required to determine waveform travel distances for every actuator 124 thereby multiple haptic feedbacks can be generated.

Figure 2A:
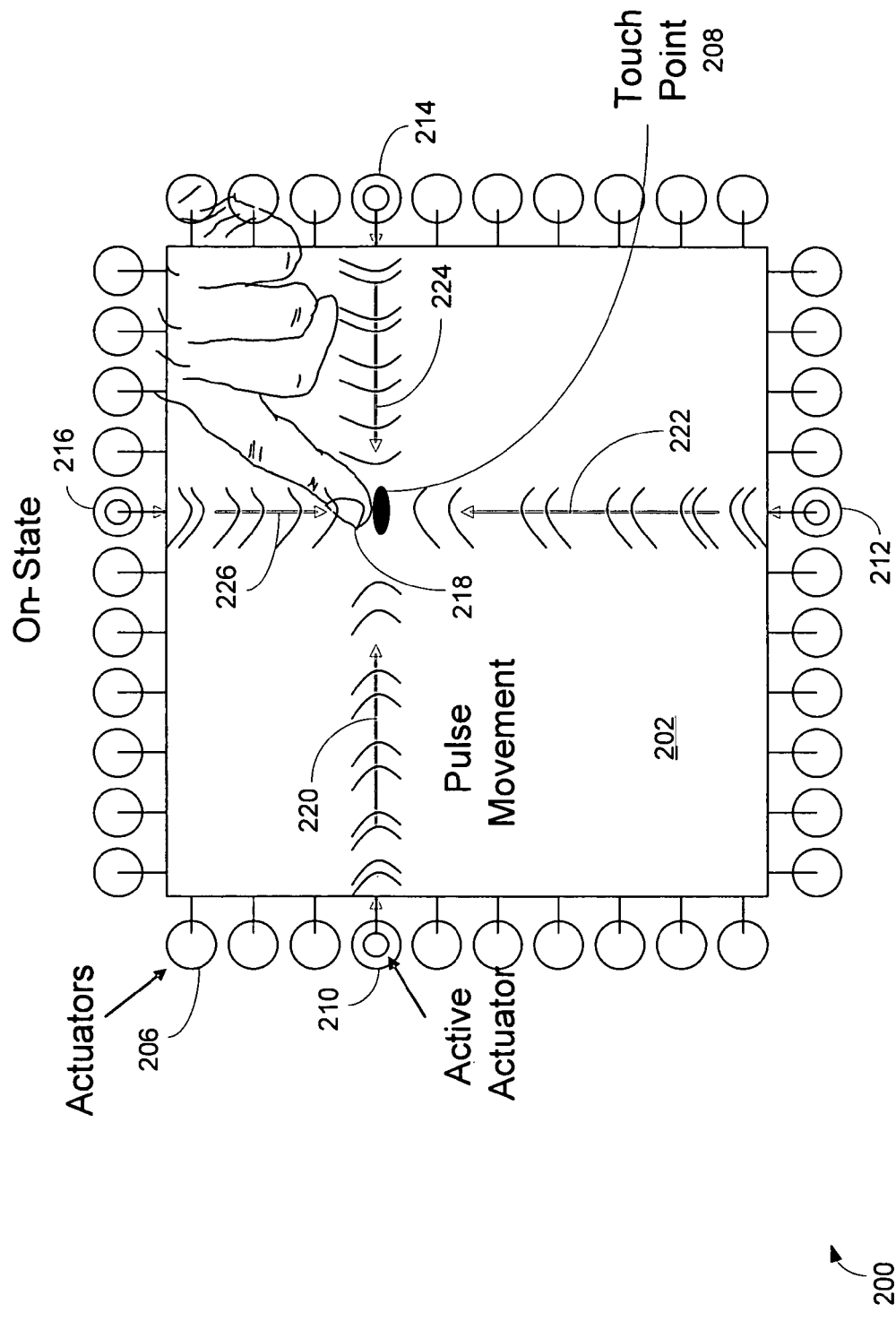
FIGS. 2(a-b) illustrate haptic devices capable of generating haptic feedback using multi-actuated waveform phasing across a touch surface in accordance with one embodiment of the present invention.

FIG. 2(a) illustrate a haptic device 200 capable of generating haptic feedback using multi-actuated waveform phasing across a touch surface in accordance with one embodiment of the present invention. Device 200 includes a touch surface 202 and a group of actuators 206 capable of providing haptic phase actuation. Actuators 206 are coupled to the perimeter of touch surface 202. Touch surface 202 is also known as a touch pad, a haptic layer, a touch sensitive surface, a flexible touch sensitive surface, or the like. It should be further noted that the underlying concept of the exemplary embodiment of the present invention would not change if one or more blocks (circuits or layers) were added to or removed from device 200.

Device 200 is activated when it detects a contact or a touch by a finger 218. Upon determining a location 208 of the touch point, distances 220-226 between actuators 210-216 and location 208 are subsequently calculated. It should be noted that distances 220-226 are different dimensions since the physical distance for an actuator such as actuator 210 is different from other actuator such as actuator 212. After identifying distances 220-226, actuators 210-216 are activated in an order in accordance with distances 220-226 whereby the pulse movements or waveforms generated by actuators 210-216 arrive at location 208 at the same time. When the pulse movements collide and strike at location 208, the haptic feedback at location 208 is intensified. It should be noted that haptic actuators or generators 210-216 react in combination or in harmony for sending haptic waveform pulses directly to location 208 with the intent of causing the waveforms to collide whereby causing an intensified haptic response at the touch interaction point(s). It should be further noted that additional actuators may be used to intensify the vibrotactile response(s). Alternatively, depending on the applications, some actuators 206 may not be necessary and can be removed from device 200.

Figure 2B:
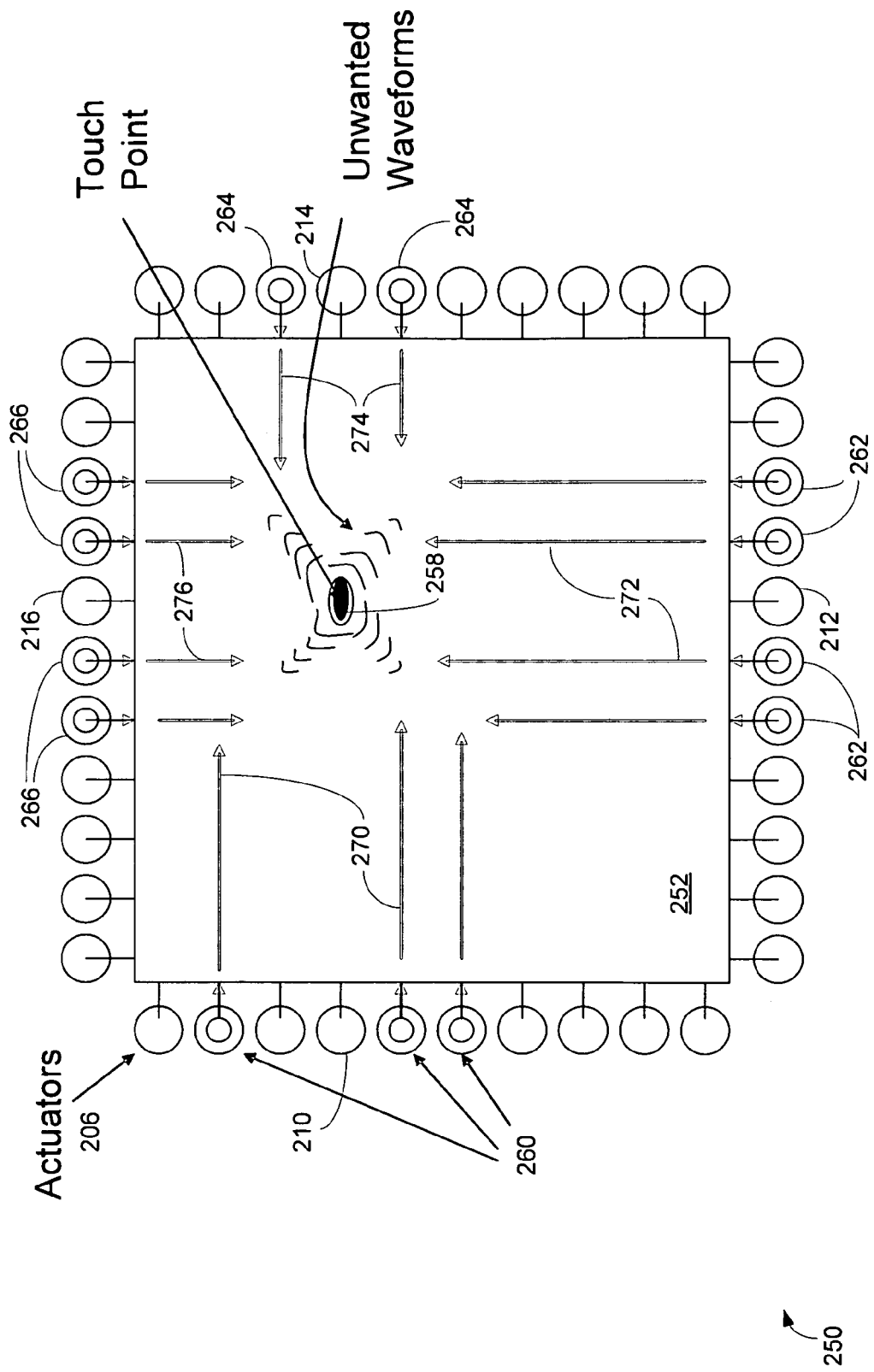

FIG. 2(b) illustrate a haptic device 250 capable of reducing unwanted haptic effect using multi-actuated waveform phasing across a touch surface in accordance with one embodiment of the present invention. Device 250 includes a touch surface 252 and a group of actuators 206 capable of providing haptic phase actuation. Actuators 206 are coupled to the perimeter of touch surface 252. It should be further noted that the underlying concept of the exemplary embodiment of the present invention would not change if one or more blocks (circuits or layers) were added to or removed from device 250.

Device 250 is activated when it detects a contact or touch by an object or a finger. Upon determining a location 258 of the touch point, distances 270-276 between actuators 260-266 and location 258 are calculated. It should be noted that distances 270-276 are different in length since the physical distance for an actuator such as actuator 260 is different from the distance for a neighboring actuator such as actuator 262. After identifying distances 270-276, actuators 260-266 are activated in accordance with distances 270-276 whereby the pulse movements or waveforms generated by actuators 260-266 cancel or minimize any unwanted waveforms outside of touch point 258. When unwanted waveforms are reduced, the haptic feedback at location 208 is increased. Depending on the applications, some actuators 206 may not be needed for reducing unwanted waveforms, and consequently, can be removed from device 200.

Device 200 or 250 can employ various types of haptic generators, haptic actuators, or a combination of different types of haptic actuators to emulate object sensations, texture sensations, haptic fabric, haptic feedback acknowledgements, or the like. It should be noted that haptic substrates, haptic actuators, and/or haptic mechanisms as described above are used to control haptic feedback for haptic device. A combination of different haptic actuators, generators, and/or haptic mechanisms can be used in a haptic device to achieve the best haptic results. The following embodiments of actuators illustrated in FIG. 3 through FIG. 8 are exemplary actuators, which can be employed to provide haptic sensation or feedback using haptic phase actuation.

Figure 3:
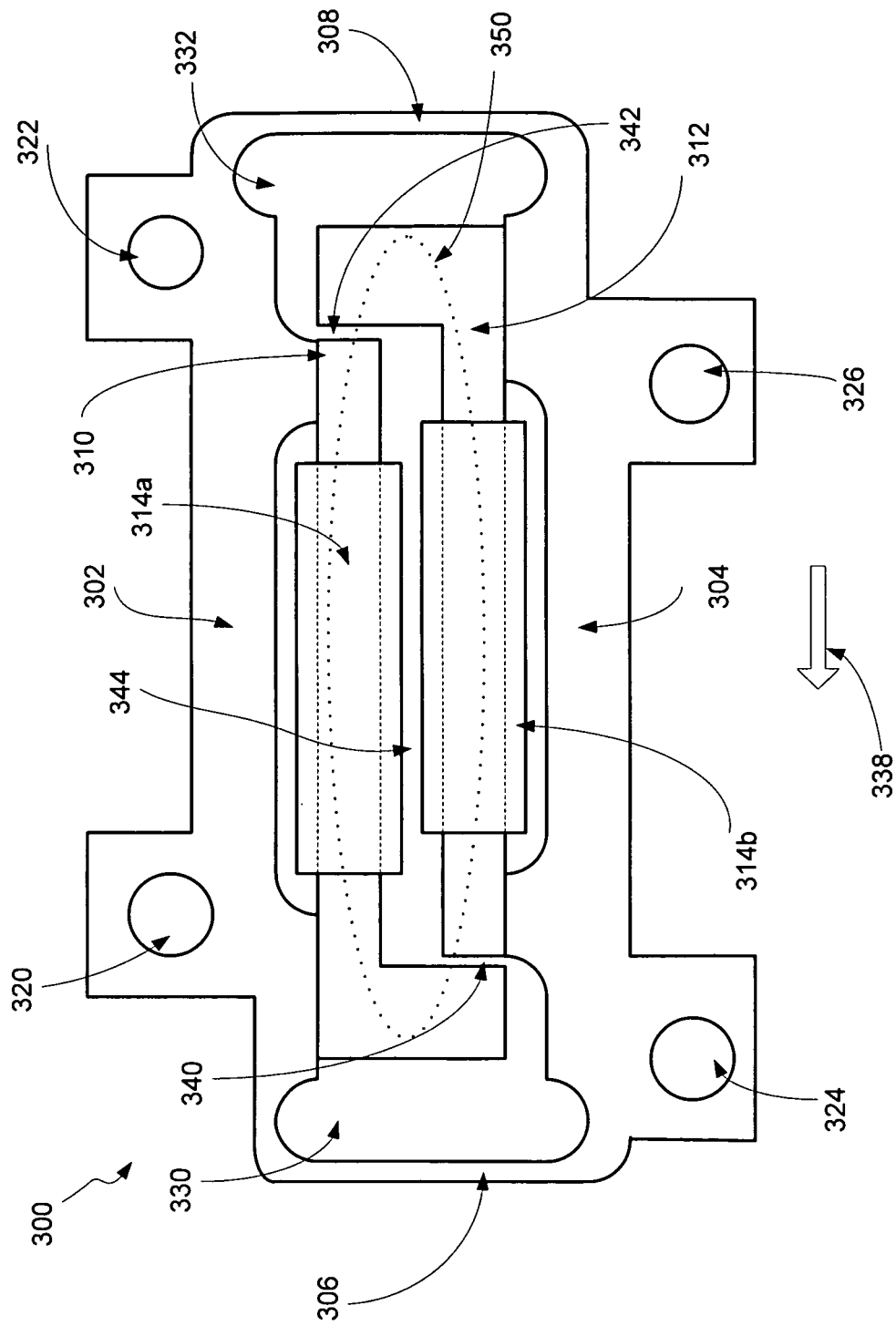
FIG. 3 illustrates an actuator capable of generating crisp haptic effects using multi-actuated waveform phasing in accordance with exemplary embodiment(s) of the present invention.

FIG. 3 illustrates an example of actuator 300 capable of generating crisp haptic effects using a relay actuator in accordance with exemplary embodiment(s) of the present invention. Actuator 300 includes two L-shaped pole pieces 310-312, first and second structural elements 302-304, and first and second biasing elements 306-308. Pole pieces 310-312 may be made of standard magnetic steels with high permeability or other suitable ferromagnetic materials such as soft magnetic materials with high magnetic permeability (e.g., iron, nickel, magnetic alloys). Pole pieces 310-312 need not be made of the same material and they are further coupled to coils 314*a*, 314*b* to form electromagnetic devices ("magnetic device"). In another embodiment, one of the pole pieces need not include a coil as long as it is fabricated with ferromagnetic material.

Actuator 300 includes structural elements 302, 304 and first and second biasing elements 306, 308 to form a frame for the actuator 300. First structural element 302, as shown in FIG. 3, includes apertures 320-322, which are coupled or fastened to housing, a display or a touch sensitive panel. Similarly, structural element 304 also contains apertures 324, 326 for similar coupling. Biasing elements 306, 308, which may be springs, flexure springs, flexible blades, flexible members, elastomeric components, foam components, and the like, are made of elastic or relatively flexible materials that can be compressed and/or stretched within a predefined range Referring again to FIG. 3, pole pieces 310 and 312 are coupled to structural elements 302 and 304, respectively. Pole piece 310 is placed adjacent to pole piece 312 with three magnetic gaps 340, 342 and 344 between the pole pieces 310, 312. The width of gaps 340, 342 is in one embodiment, in a range of about 0.25 to about 0.75 mm. Air pockets 330, 332, which can be of any shape, provide space for pole pieces 310, 312 to move. Because gaps 340, 342 are much smaller than gap 344, the attractive magnetic force at gaps 340, 342 dominates over any attractive force across gap 344.

In operation, biasing elements 306, 308 provide minimal force if there is no current passing through coils 314 and the actuator is (accordingly) in a relaxed state. Under this no power condition, the actuator attains a first equilibrium position as shown, for example, in FIG. 3. When power is applied to coil(s) 314*a*-314*b*, an input current passes through the coil(s) creating magnetic flux lines 350 in pole pieces 310-312 and across gaps 340-342. This process generates an attractive force or attractive magnetic force between pole pieces 310-312 when the coils are wound so that the electromagnetic effects do not cancel one another. The term attractive force and attractive magnetic force are used interchangeably herein. The attractive magnetic force acts against biasing elements 306-308 and pulls pole pieces 310-312 closer together at gaps 340-342. In accordance with the embodiment shown in FIG. 3, under the attractive magnetic force, with structural element 302 held fixed, pole piece 312 moves in a direction from right to left (as indicated by arrow 338) toward pole piece 310. Pole piece 310, in this embodiment, may be fastened or secured to structural element 302, which may be further secured to a housing, touch sensitive panel or display device. When one of pole pieces 310-312 is displaced enough distance within gaps 340-342, a second equilibrium position is reached as increasing spring force is applied in an opposite direction by biasing elements 306-308. When power is then reduced or removed, the biasing elements 306-308 force pole pieces 310-312 back to their original no-power position, also known as the first equilibrium position as described earlier.

FIG. 4(*a*) illustrates a tactile or haptic region 410 using piezoelectric materials to generate haptic effects in accordance with one embodiment of the present invention. Region 410 includes an electrical insulated layer 402, a piezoelectric material 404, and wires 406. Electrical insulated layer 402 has a top surface and a bottom surface, wherein the top surface is configured to receive inputs. A grid or an array of piezoelectric materials 404 in one embodiment is constructed to form a piezoelectric or haptic layer, which also has a top and a bottom surface. The top surface of the piezoelectric layer is situated adjacent to the bottom surface of electrical insulated layer 402. Each region 410 includes at least one piezoelectric material 404 wherein piezoelectric material 404 is used to generate haptic effects independent of other piezoelectric region 410 in piezoelectric layer. In one embodiment, multiple adjacent or neighboring regions 410 are capable of generating multiple haptic effects in response to multiple substantially simultaneous touches. In another embodiment, each of regions 410 has a unique piezoelectric material thereby it is capable of initiating a unique haptic sensation.

It should be noted that a tactile touch panel, which includes an electrical insulated layer 402 and a piezoelectric layer, in some embodiments further includes a display, not shown in the figure. This display may be coupled to the bottom surface of the piezoelectric layer and is capable of projecting images that are viewable from the top surface of electrical insulated layer 402. It should be noted that the display can be a flat panel display or a flexible display. Piezoelectric materials 404, in one embodiment, are substantially transparent and small. The shape of piezoelectric material 404, for example, deforms in response to electrical potentials applied via electrical wires 406.

During a manufacturing process, a piezoelectric film is printed to include an array or a grid of piezoelectric regions 410. In one embodiment, a film of regions 410 containing piezoelectric materials is printed on a sheet in a cell grid arrangement. The film further includes wirings for directly addressing every region 410 in the device using electrical control signals. Region 410, for example, can be stimulated using edge or back mounted electronics. Piezoelectric materials may include crystals and/or ceramics such as quartz ($SiO_2$).

FIG. 4(*b*) illustrates a tactile or haptic region 410 generating haptic effects in accordance with an embodiment of the present invention. During operation, when a voltage potential applies to piezoelectric material 405 via wires 406, piezoelectric material 405 deforms from its original shape of piezoelectric material 404, as shown in FIG. 4(*a*), to an expanded shape of piezoelectric material 405. Deformation of piezoelectric material 405 causes electrical insulated layer 403 to deform or strain from its original state of layer 402, as shown in FIG. 4(*a*). In an alternative embodiment, piezoelectric materials 405 return to its original state as soon as the voltage potential is removed. It should be noted that the underlying concept of the present invention does not change if additional blocks (circuits or mechanical devices) are added to the device illustrated in FIG. 4(*a-b*). If the piezoelectric material is replaced with other materials such as SMAs, such material may be capable of maintaining its deformed shape for a period of time after the voltage potential is removed. It should be noted that the underlying concept of the embodiments of the present invention does not change if different materials other than piezoelectric actuators are employed. As such a grid of piezoelectric actuators may be used to control the surface texture of touch sensitive surface of the interface device.

FIG. 4(*c*) is a diagram 450 illustrating another embodiment of a tactile or haptic region or cell 410 using MEMS device 452 to generate haptic effects in accordance with one embodiment of the present invention. Diagram 450 depicts a block 460, which shows a top view of cell 410. Cell 410 includes a MEMS device 452. In one embodiment, MEMS device 452 is substantially transparent thereby the image projection from a display, not shown in FIG. 4(*c*), can be viewed through block 460. It should be noted that each of haptic cells 410 is coupled to at least one wire to facilitate and generate haptic effects.

MEMS can be considered as an integration of mechanical devices, sensors, and electronics on a silicon or organic semiconductor substrate, which can be manufactured through conventional microfabrication process. For example, the electronic devices may be manufactured using semiconductor fabrication process and micromechanical devices may be fabricated using compatible microfabrication process. In one embodiment, a grid or an array of MEMS devices 452 are made of multiple cantilever-springs. A grid of cantilever-springs can be etched using MEMS manufacturing techniques. Also, electrical wirings for stimulating or driving cantilever-springs can also be directly etched onto the surface of the MEMS device 452 thereby every single MEMS device can be correctly addressed. MEMS cantilevers can be stimulated using a resonant drive (for vibrotactile) or direct actuation (kinesthetic).

FIG. 4(*d*) illustrates a side view of MEMS device 452, wherein MEMS device 462 can be stimulated or deformed from its original state of MEMS device 452 to deformed state of MEMS device 464 when a voltage potential across MEMS device is applied. Displacement 454 between the original state and the deformed state depends on the composition of materials used and the size of MEMS device 452. Although smaller MEMS devices 452 are easier to fabricate, they offer smaller displacement 454. In one embodiment, cantilever-springs can be made of piezo materials. It should be noted that the actuation of piezo material is generally vibrotactile sensation. It should be further noted that piezo material can be used as a sensor for sensing fingertip positions and depressions.

MEMS device 452, in another embodiment, uses SMA in place of cantilever-spring as mentioned above. The actuation generated by MEMS device 452 using SMA provides kinesthetic actuation. SMA, also known as memory metal, could be made of copper-zinc-aluminum, copper-aluminum-nickel, nickel-titanium alloys, or a combination of copper-zinc-aluminum, copper-aluminum-nickel, and/or nickel-titanium alloys. Upon deforming from SMA's original shape, SMA regains its original shape in accordance with an ambient temperature and/or surrounding environment. It should be noted that the present invention may combine piezoelectric elements, cantilever-spring, and/or SMA to achieve a specific haptic sensation. As such, a grid of MEMS device 452 may be used to control the surface texture of touch sensitive surface of the interface device.

Figure 5A:
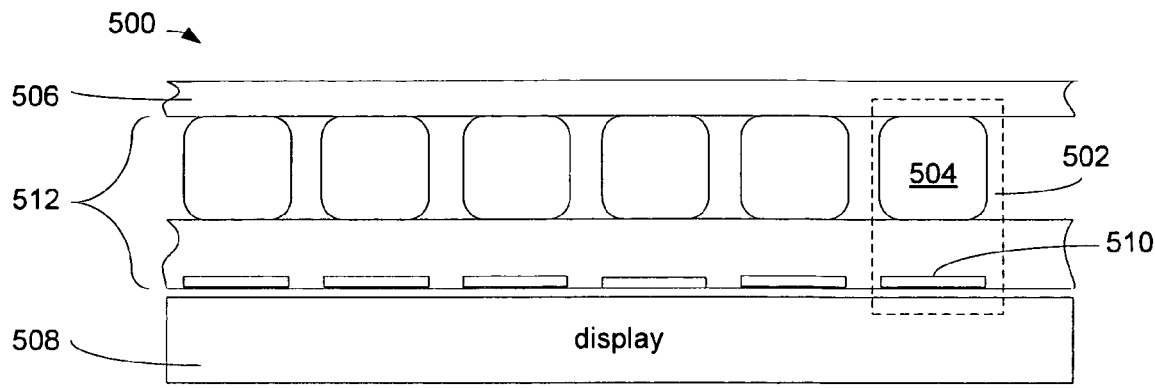
FIG. 5(a-b) illustrates a side view of a haptic device having an array of haptic cells with thermal fluid pockets in accordance with one embodiment of the present invention.
Figure 5B:
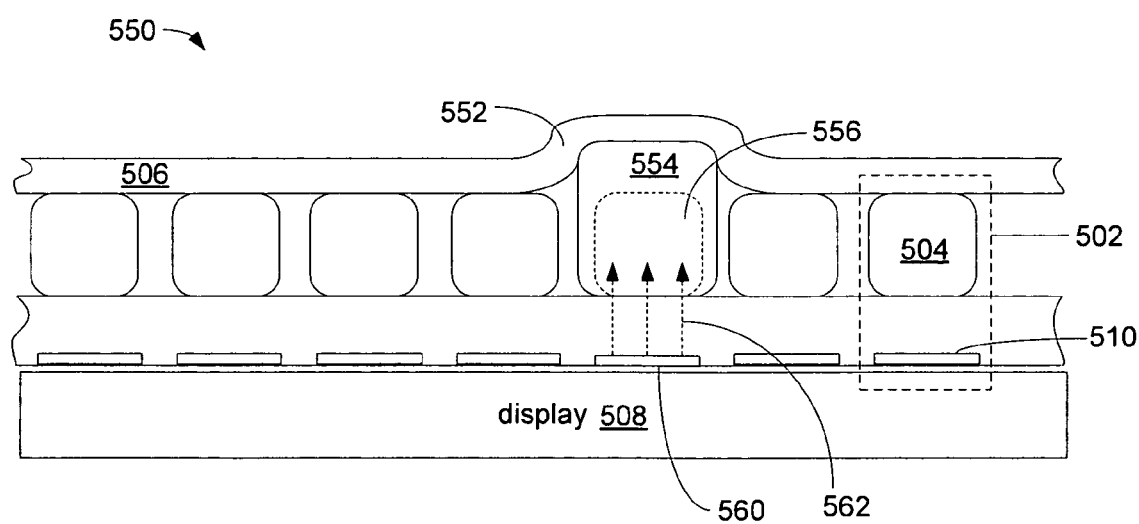

FIG. 5(*a*) is a side view diagram of an interface device 500 illustrating an array of haptic cells or tactile region 502 with thermal fluid pockets 504 in accordance with one embodiment of the present invention. Device 500 includes an insulated layer 506, a haptic layer 512, and a display 508. While the top surface of insulated layer 506 is capable of receiving inputs from a user, the bottom surface of insulated layer 506 is placed adjacent to the top surface of haptic layer 512. The bottom surface of haptic layer 512 is placed adjacent to display 508, wherein haptic layer 512 and insulated layer 506 may be substantially transparent thereby objects or images displayed in display 508 can be seen through haptic layer 512 and insulated layer 506. It should be noted that display 508 is not a necessary component in order for the interface device to function.

Haptic layer 512, in one embodiment, includes a grid of fluid filled cells 502, which further includes at least one thermal fluid pocket 504 and an associated activating cell 510. It should be noted that each of fluid filled cells 502 can include multiple thermal fluid pockets 504 and associated activating cells 510. In another embodiment, a fluid filled cell 502 includes multiple associated or shared activating cells 510 thereby initiating a different activating cell generates a different haptic sensation(s).

Activating cell 510, in one embodiment, is a heater, which is capable of heating an associated thermal fluid pocket 504. Various electrical, optical, and mechanical techniques relating to heating technology can be used to fabricate activating cells 510. For example, various electrically controlled resistors can be used for activating cells 510, wherein resistors can be implanted in haptic layer 512 during the fabrication. Alternatively, optical stimulators such as infrared lasers can be used as activating cells 510 to heat up thermal fluid pockets 504. Optical stimulator, for example, can be mounted at the edge of the interface device. It should be noted that activating cells 510 can be any types of optical or radioactive stimulator as long as it can perform the function of a heating device. Activating cells 510 may also include rear mounted thermal stimulators, which are similar technologies like hot plasma displays such as are commonly found in flat panel plasma televisions.

Device 500 further includes a set of control wires, not shown in FIG. 5(*a*), wherein each of activating cells 510 is coupled to at least one pair of wires. The wires are configured to transmit activating/deactivating control signals, which are used to drive activating cells 510. It should be noted that each of fluid filled cells 502 is addressable using signals from wires or wireless networks. Display 508, in one aspect, can be a flat panel display or a flexible display. In an alternative embodiment, the physical location of display 508 is exchangeable with haptic layer 512. Also, thermal fluid pockets 504, in one embodiment, can be activated by a piezoelectric grid.

Thermal fluid pockets 504, in one embodiment, include fluid with physical properties of low specific heat and high thermal expansion. Examples of this fluid include glycerin, ethyl alcohol, or the like. Thermal fluid pockets 504 are capable of producing multiple localized strains in response to multiple touches received by insulated layer 506. Each localized strain is created by a heated thermal fluid pocket 504 wherein the heat is generated by an associated activating cell 510. In one embodiment, a thermal fluid pocket 504 changes its physical shape in accordance with the temperature of the fluid in the pocket. In another embodiment, fluid filled cell 502 has an active cooling system, which is used to restore the expanded shape of thermal fluid pocket 504 to its original shape after it is deactivated. The control of fluid temperature affects haptic bandwidth. Rapid rising of fluid temperature and fast heat dissipation of fluid enhance haptic bandwidth of thermal fluid packets.

The physical size of each fluid cell 502 can also affect the performance of the cell for generating haptic sensation(s). For example, if the size of fluid cell 504 is smaller than ½ fingertip, the performance of cell 504 enhances because smaller cell permits rapid heat dissipation as well as quick temperature rising of fluid in the cell. In another embodiment, thermal plastic pockets filled with plastic fluid are used in place of thermal fluid pockets 504 filled with thermally sensitive fluid to enhance the haptic effects. Using thermal plastic pockets filled with plastic-like fluid can produce high thermal plastic strain. For example, a type of plastic fluid is polyethylene. Thermal plastic pockets can also provide different and unique haptic sensations to the user. In another embodiment, some exotic fluids such as electrorheological and/or magnetorheological fluid can be used in place of thermal fluid in thermal fluid pockets 504. Thermal fluid pockets 504 filled with electrorheological fluid can be stimulated by a local or remote electrical field, while thermal fluid pockets 504 filled with magnetorheological fluid can be stimulated by a local or remote magnetic field.

FIG. 5(*b*) is a side view diagram for an interface device 550 illustrating an array of haptic cells 502 using thermal fluid pockets 554 in accordance with one embodiment of the present invention. Device 550 also shows an activated thermal fluid pocket 554 and an activated activating cell 560. During the operation, thermal fluid pocket 554 increases its physical volume (or size) from its original state 556 to expanded thermal fluid pocket 554 when activating cell 560 is activated. When activating cell 560 is activated, it provides heat 562 to thermal fluid pocket 554 or 556 to expand the size of thermal fluid pocket 554 or 556. Due to the expansion of thermal fluid pocket 554, a localized portion 552 of insulated layer 506 is created. As soon as the temperature of the fluid in the thermal fluid pocket 554 cools down, the size of thermal fluid pocket 554 returns to its original state 556. The change of size between original size of a thermal fluid pocket 556 and expanded size of thermal fluid pocket 554 generates a haptic effect. It should be noted that activating cell 560 could be an electric heater or an optical heater such as an infrared simulator. As such, an array of haptic cells using thermal fluid pockets 552 may be used to control the surface texture of touch sensitive surface of the interface device.

FIG. 6(a) is a side view diagram of an interface device 600 illustrating an array of MEMS pumps 602 in accordance with one embodiment of the present invention. The array of MEMS pumps 602 can be used to implement tactile regions for controlling surface textures. Diagram 600 includes an insulated layer 606 and a haptic layer 612. While the top surface of insulated layer 606 is configured to receive a touch or touches from a user, the bottom surface of insulated layer 606 is placed adjacent to the top surface of haptic layer 612. The bottom surface of haptic layer 612 is, in one embodiment, placed adjacent to a display (not shown in FIG. 6(a)), wherein haptic layer 612 and insulated layer 606 may be substantially transparent thereby objects or images displayed in the display can be seen through haptic layer 612 and insulated layer 606. It should be noted that display is not a necessary component in order for the interface device to function.

Haptic layer 612, in one embodiment, includes a grid of MEMS pumps 602, which further includes at least one pocket 604. Each MEMS pump 602 includes a pressurized valve 608 and a depressurized valve 610. Pressurized valve 608 is coupled to an inlet tube 614 while depressurized valve 610 is coupled to an outlet tube 616. In one embodiment, inlet tube 614, which is under high liquid pressure, is used to pump liquid through pressurized valve 608 to expand pocket 604. Similarly, outlet tube 616, which is under low pressure, is used to release the liquid through depressurized valve 610 to release the pressure from pocket 604. In one embodiment, MEMS pumps 602 can be coupled to the same pressurized liquid reservoir. In addition, pressurized valve 608 and depressurized valve 610 may be combined into one single valve for both inlet tube 614 and outlet tube 616. It should be noted that inlet tube 614 and outlet tube 616 can also be combined into one tube.

A grid of MEMS pumps 602 includes an array of pressurized valves 608 and depressurized valves 610, wherein pressurized valves 608 are coupled with a rear or a side mounted liquid reservoir under pressure while depressurized valves 610 are coupled to a rear or a side mounted depressurized liquid reservoir with low pressure. Valves 608-610 control the filling and emptying the liquid pockets 604 in MEMS pumps 602 to produce localized strain. An advantage of using pressurized liquid reservoir is to quickly deform the surface of insulated layer 606 and to maintain the deformation with minimal or no energy consumption (or expenditure). It should be noted that MEMS pump 602 can also use pressurized air or other gases to achieve similar results as liquid.

Device 600 further includes a set of control wires 617-618, which can be used to control pressurized valve 608 and depressurized valve 610, respectively. It should be noted that each valve in haptic layer 612 is addressable using electrical signals transmitted from wires or wireless network.

Figure 6:
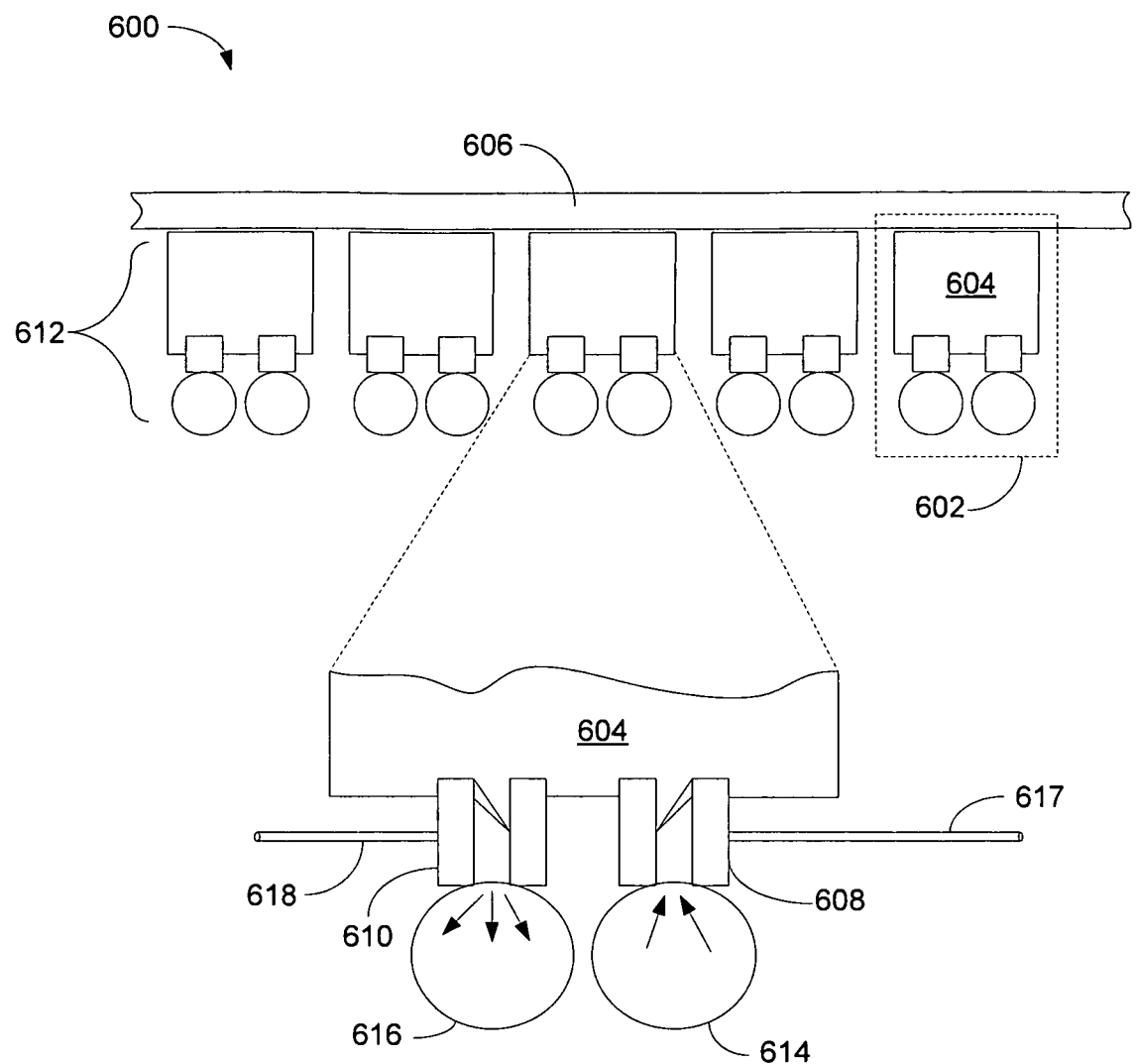
FIG. 6(a-b) illustrates a haptic cell employing Micro-Electro-Mechanical Systems pumps to generate haptic effects in accordance with one embodiment of the present invention.
Figure 6B:
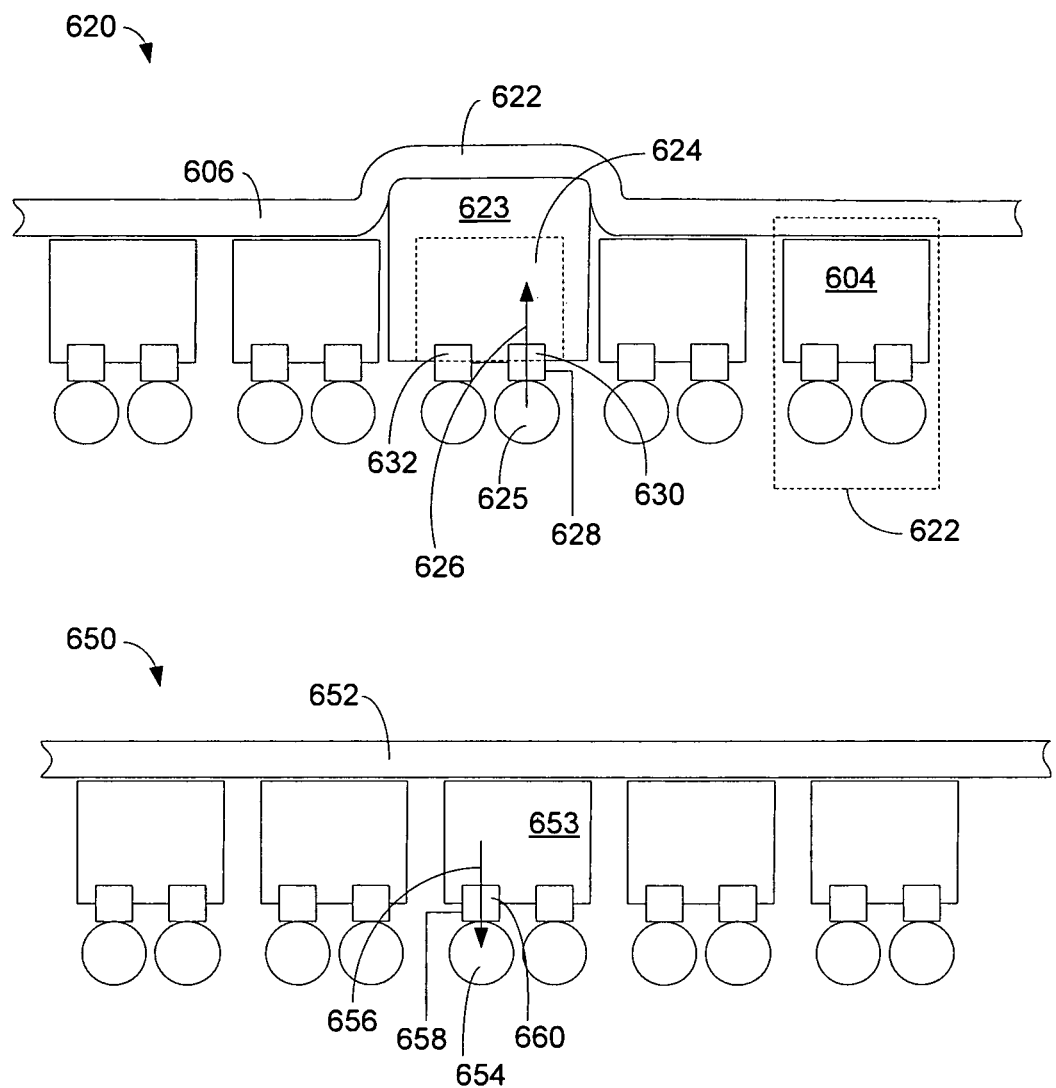

FIG. 6(b) illustrates two diagrams of an interface device 620 and 650 having an array of MEMS pumps 604 in accordance with one embodiment of the present invention. Device 620 illustrates an activated pocket 623, which includes an activated inlet valve 630 and a deactivated outlet valve 632. During an operation, pocket 623 increases its physical volume (or size) from its original state 624 to its expanded pocket 623 when inlet valve 630 is activated. When inlet valve 630 is activated (or open) in response to electrical signal from wire 628, inlet tube 625 pumps liquid 626 from pressurized reservoir to pocket 623. Due to the expansion of pocket 623, a localized strain 622 of insulated layer 606 is created.

Device 650 illustrates an activated MEMS pump returns from its expanded state of pocket 623 to the original state of pocket 653. When depressurized valve 660 is activated, depressurized valve 660 releases liquid 656 from pocket 653 to low pressurized outlet 654. It should be noted that depressurized valve 660 is controlled by at least one control signal via wire 658. The change in volume between original size of pocket 604 and expanded size of pocket 623 generates haptic effects. As such, an array of MEMS pumps 602 may be used to control the surface texture of touch sensitive surface of the interface device.

Figure 7:
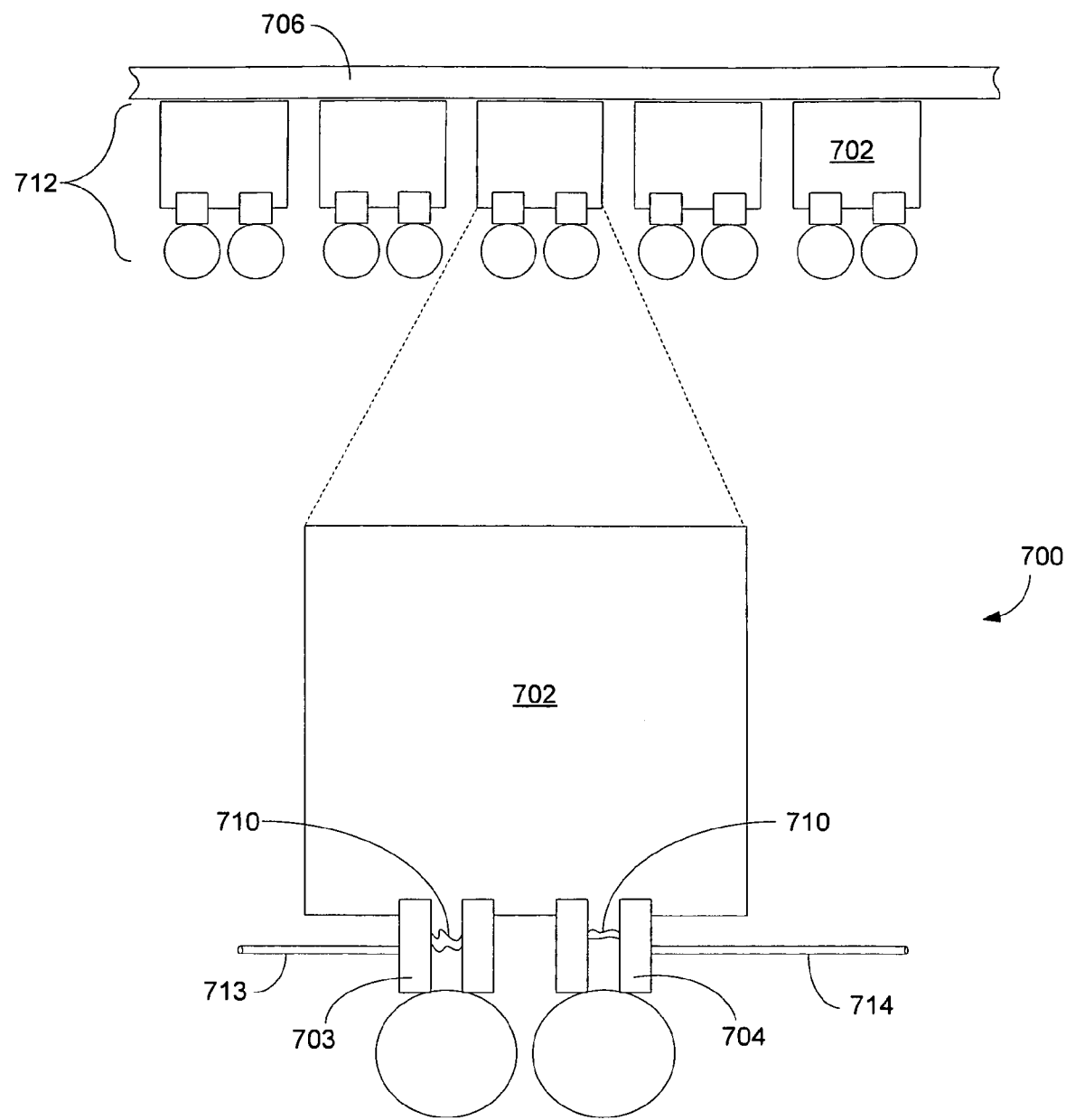
FIG. 7 illustrates a side view diagram for a haptic device having an array of haptic cells using variable porosity membrane in accordance with one embodiment of the present invention.

FIG. 7 illustrates a side view diagram for an interface device 700 having an array of haptic cells 702 using variable porosity membrane 710 in accordance with one embodiment of the present invention. The porosity membrane 710 can be used to implement tactile regions for controlling surface textures. Device 700 includes an insulated layer 706 and a haptic layer 712. While the top surface of insulated layer 706 is configured to receive inputs from a user, the bottom surface of insulated layer 706 is placed adjacent to the top surface of haptic layer 712. The bottom surface of haptic layer 712 is, in one embodiment, placed adjacent to a display (not shown in FIG. 7), wherein haptic layer 712 and insulated layer 706 may be substantially transparent thereby objects or images displayed in the display can be seen through haptic layer 712 and insulated layer 706. It should be noted that display is not a necessary component in order for the interface device to function.

Haptic layer 712, in one embodiment, includes a grid of haptic cells 702, inlet valves 703, and outlet valves 704. Haptic cells 702, in one embodiment, are pockets capable of containing fluid. Haptic layer 712 is similar to haptic layer 612 as shown in FIG. 6(a) except that haptic layer 712 employs porosity membranes. While each inlet valve 703 is controlled by control signal(s) transmitted by wire 713, each outlet valve 704 is controlled by electrical signals transmitted over a wire 714. Every inlet valve 703 or outlet valve 704 employs at least one porosity membrane 710. Porosity membranes 710 are coupled (or faced) to a liquid reservoir wherein each membrane 710 is configured to control how much liquid should enter and/or pass through membrane 710. An advantage of using porosity membranes is to maintain the deformation of insulated layer 706 with minimal or no energy consumption. As such, a grid of haptic cells using variable porosity membrane 710 may be used to control the surface texture of touch sensitive surface of the interface device.

Figure 8:
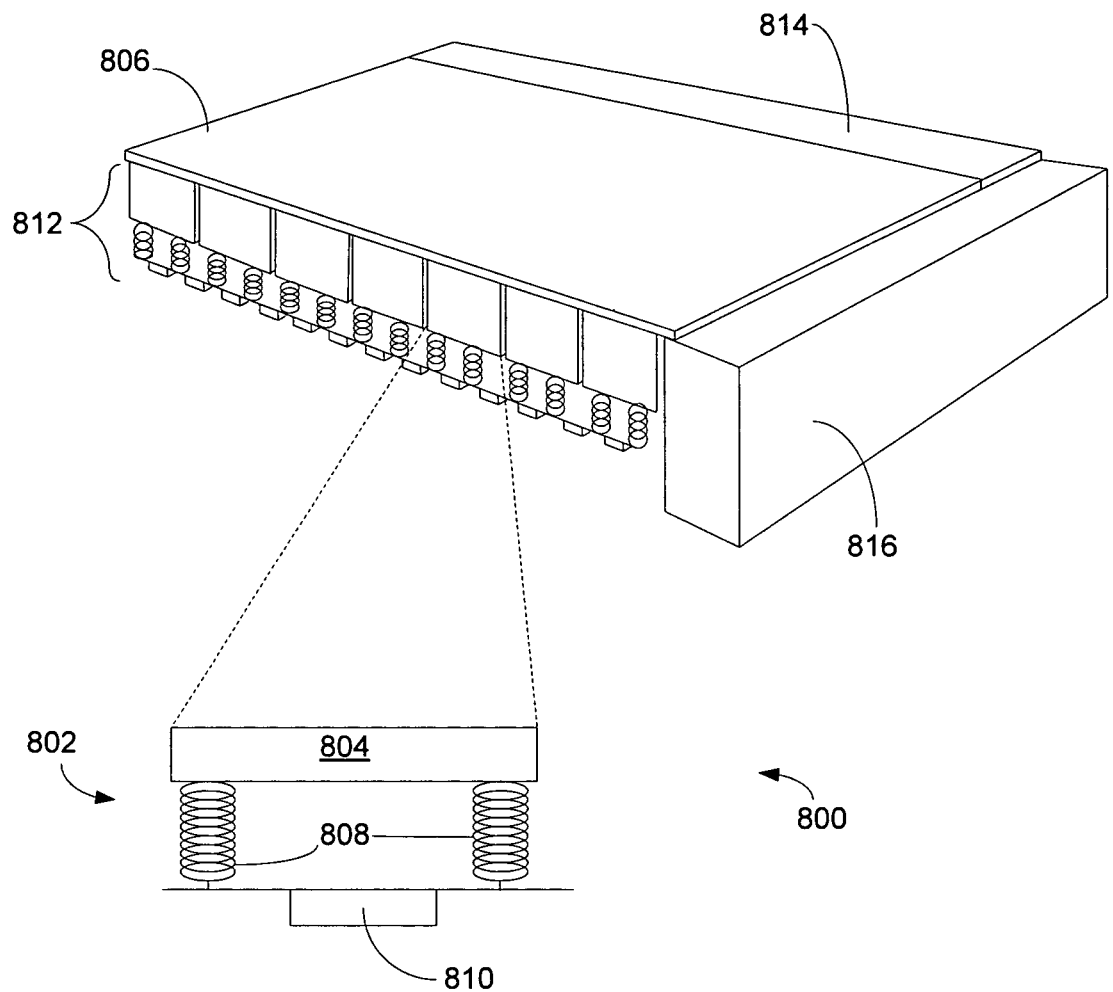
FIG. 8 is a side view of a haptic device having an array of haptic cells using various resonant devices in accordance with one embodiment of the present invention.

FIG. 8 is a side view of an interface device 800 having an array of haptic cells 802 using various resonant devices in accordance with one embodiment of the present invention. The array of haptic cells 802 can be used to implement tactile regions for controlling surface textures. Device 800 includes an insulated layer 806 and a haptic layer 812. While the top surface of insulated layer 806 is configured to receive an input from a user, the bottom surface of insulated layer 806 is placed adjacent to the top surface of haptic layer 812. The bottom surface of haptic layer 812 is, in one embodiment, placed adjacent to a display (not shown in FIG. 8), wherein haptic layer 812 and insulated layer 806 may be substantially transparent thereby objects or images displayed in the display can be seen through haptic layer 812 and insulated layer 806. It should be noted that insulated layer 806 may be flexible whereby it is capable of providing desirable relief information on its surface.

Haptic layer 812, in one embodiment, includes a grid of haptic cells 802, wherein each cell 802 further includes a permanent magnet 804, an electro magnet 810, and two springs 808. Haptic layer 812 is similar to haptic layer 612 shown in FIG. 6(a) except that haptic layer 812 employs resonant devices while haptic layer 612 uses MEMS pumps. Haptic cell 802, in one embodiment, uses a resonant mechanical retractable device to generate haptic effects. The resonant mechanical retractable device vibrates in response to a unique frequency, which could be generated by a side mounted resonant stimulator 816 or a rear mounted resonant stimulator 814. A resonant grid, in one embodiment, is used to form a haptic layer 812. Each cell 802 is constructed using resonant mechanical elements such as linear resonant actuator or MEMS springs. Each cell 802, however, is configured to have a slightly different resonant frequency and a high Q (high amplification at resonance and a narrow resonant frequency band). As such, each cell 802 can be stimulated using mechanical pressure waves originating at the edges of the sheet. The haptic effects can also be generated by a piezo-electric or other high bandwidth actuator.

Cell 802, in another embodiment, includes one spring 808. In yet another embodiment, cell 802 includes more than two springs 808. Each spring 808 is configured to respond to a specific range of frequencies thereby each spring 808 can produce a unique haptic sensation. As such, a grid of haptic cells using various resonant devices may be used to control the surface texture of touch sensitive surface of the interface device. For example, if the displacement of haptic mechanism is sufficiently high such as 200 micrometers or greater, the movement (or tactile vibration) with low frequencies such as 50 Hz or less should sufficiently create desirable relief information.

The exemplary embodiment(s) of the present invention includes various processing steps which will be described below. The steps of the embodiments may be embodied in machine or computer executable instructions. The instructions can be used to cause a general purpose or special purpose system or controller, which is programmed with the instructions, to perform the steps of the embodiment(s) of the present invention.

Figure 9:
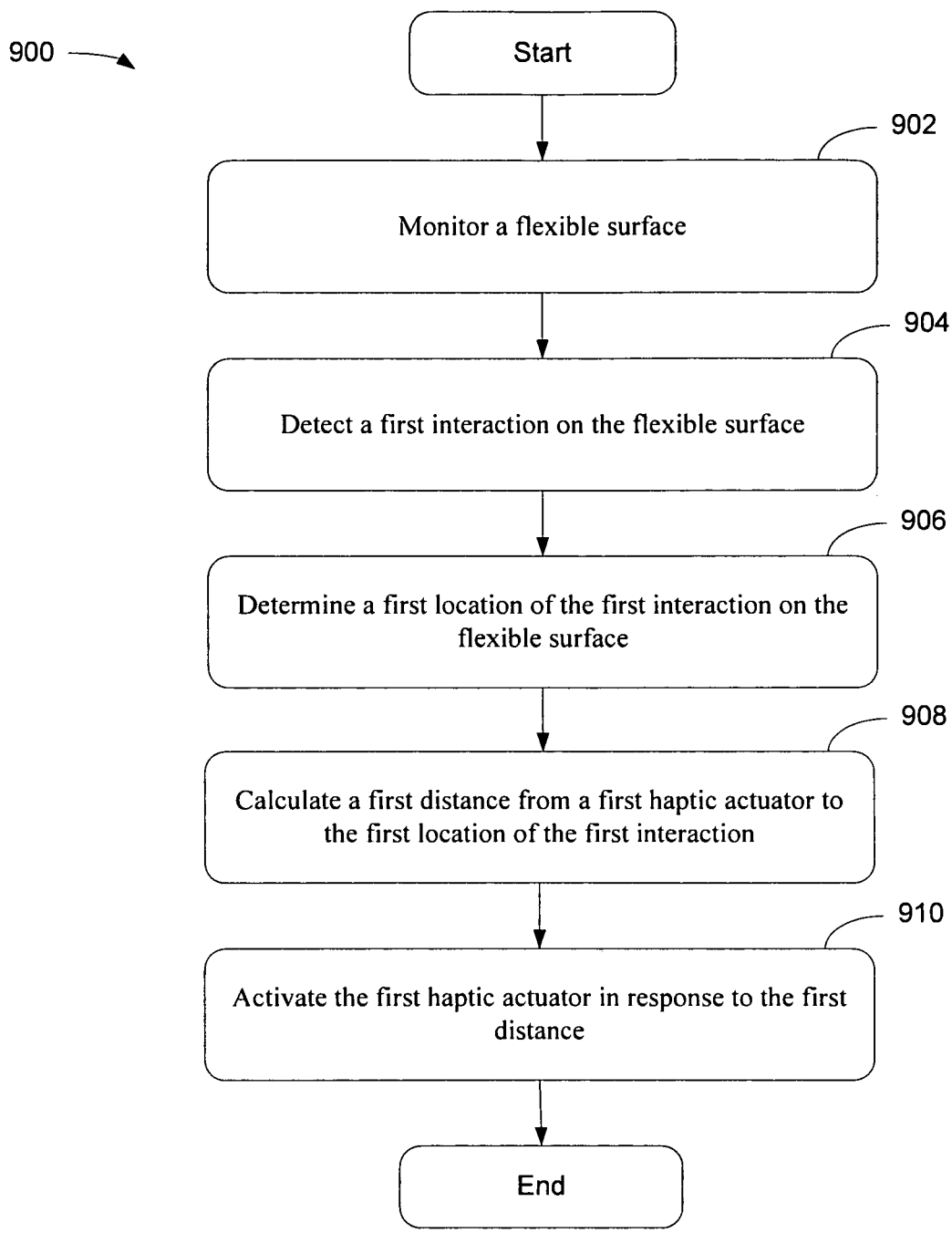
FIG. 9 is a flowchart illustrating a process of generating haptic feedback using multi-actuated waveform phasing in accordance with one embodiment of the present invention.

FIG. 9 is a flowchart 900 illustrating a process of generating haptic feedback using multi-actuated waveform phasing in accordance with one embodiment of the present invention. At block 902, the process monitors a flexible surface or touch surface in accordance with a set of predefined parameters or events. For example, the process is capable of sensing a contact, movement, predefined temperature, light, and/or a predefined audible sound.

At block 904, the process detects an interaction on the flexible surface in response to an event. For example, the process is able to sense or detect a depression by a pointed object on the flexible surface. It should be noted that the pointed object can be a finger, a stylus, a pen, or the like.

At block 906, the process is capable of determining a location of the contact on the flexible surface in response to the interaction. In one embodiment, the process is capable of identifying physical coordinates of a contact point with respect to the flexible or touch surface. For example, the process translates the location of contact point into a two-dimensional coordinating system such as x-axis and y-axis.

At block 908, the process is able to calculate a first distance from a first haptic actuator to the location and a second distance from a second haptic actuator to the location. It should be noted that some distances are used for generating haptic feedback while other distances are utilized for reducing unwanted haptic effect.

At block 910, the process activates the first haptic actuator in response to the first distance and the second haptic actuator in response to the second distance to generate haptic feedback at the location of the interaction. A haptic wave capable of traveling via a medium of a flexible surface is initiated to generate haptic feedback at the first location when the haptic wave reaches the location. In one aspect, upon calculating a third distance from a third haptic actuator to the location and a fourth distance from a fourth haptic actuator to the location, a third haptic actuator is activated in response to the third distance and a fourth haptic actuator is activated in response to the fourth distance. Note that the third and fourth actuators are used to cancel or reduce any unwanted haptic effect on the flexible surface. In another aspect, upon detecting a second interaction on the flexible surface, the process determines a second location of the second interaction on the flexible surface in response to the second interaction. After calculating a fifth distance from a fifth haptic actuator to the second location and a sixth distance from a sixth haptic actuator to the second location, the process activates the fifth haptic actuator in response to the fifth distance and the sixth haptic actuator in response to the sixth distance for providing haptic feedback at the second location. In another embodiment, after calculating a seventh distance from a seventh haptic actuator to the second location of the second interaction, the process is able to activate the seventh haptic actuator in response to the seventh distance for minimizing unwanted haptic effect on the flexible surface.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope of all such changes and modifications as are within the true spirit and scope of the exemplary embodiment(s) of the present invention.

What is claimed is:

1. A haptic device, comprising:
   a touch surface configured to sense a first event;
   a first plurality of haptic actuators coupled to the touch surface, each of the first plurality of haptic actuators configured to generate at least one haptic waveform pulse to provide haptic feedback to the touch surface in response to the first event; and
   a second plurality of haptic actuators coupled to the touch surface, each of the second plurality of haptic actuators configured to generate at least one canceling haptic waveform pulse to minimize unwanted haptic effects on the touch surface in accordance with the first event.

2. The device of claim 1, further comprising a haptic sensor coupled to the touch surface and configured to sense the first event, wherein the haptic sensor calculates a distance between at least one of the haptic actuators and a location of the first event.

3. The device of claim 1, wherein the touch surface is a flexible touch sensitive surface, wherein the flexible touch sensitive surface is made of gel materials.

4. The device of claim 1, wherein the touch surface is a flexible wave transmittable touch pad.

5. The device of claim 1, wherein the first event includes a depression on the touch surface by a finger.

6. The device of claim 1, wherein the first event includes a depression on the touch surface by a stylus.

7. The device of claim 1, wherein the first plurality of haptic actuators are coupled to perimeter of the touch surface and configured to generate and send haptic waves to an interactive point.

8. The device of claim 1, wherein the first plurality of haptic actuators are configured to generate and send multiple haptic waveform pulses to an interactive point, wherein the haptic waveform pulses arrive at the interactive point at substantially same time.

9. The device of claim 1, wherein the second plurality of haptic actuators are configured to generate and send multiple canceling haptic waveform pulses to cancel various unwanted haptic waveform pulses on the touch surface.

10. The device of claim 1,
wherein the touch surface is further configured to sense a second event; and
wherein the first plurality of haptic actuators are configured to generate haptic feedback to the touch surface in response to the second event.

11. The device of claim 1, wherein the first and second plurality of actuators include one or more types of haptic elements.

12. A method of providing haptic feedback, comprising:
detecting a first interaction on a flexible surface;
determining a first location on the flexible surface in response to the first interaction;
calculating a first distance from a first haptic actuator to the first location and a second distance from a second haptic actuator to the first location; and
activating the first haptic actuator to generate a first haptic waveform pulse in response to the first distance and the second haptic actuator to generate a second haptic waveform pulse in response to the second distance to generate haptic feedback at the first location.

13. The method of claim 12, further comprising:
monitoring a flexible surface; and
calculating a third distance from a third haptic actuator to the first location and a fourth distance from a fourth haptic actuator to the first location.

14. The method of claim 13, further comprising activating the third haptic actuator in response to the third distance and the fourth haptic actuator in response to the fourth distance to cancel unwanted haptic effect on the flexible surface.

15. The method claim 12, further comprising:
detecting a second interaction on the flexible surface;
determining a second location on the flexible surface in response to the second interaction;
calculating a fifth distance from a fifth haptic actuator to the second location and a sixth distance from a sixth haptic actuator to the second location; and
activating the fifth haptic actuator in response to the fifth distance and the sixth haptic actuator in response to the sixth distance to generate haptic feedback at the second location.

16. The method of claim 15, further comprising:
calculating a seventh distance from a seventh haptic actuator to the second location; and
activating the seventh haptic actuator in response to the seventh distance to minimize unwanted haptic effect on the flexible surface.

17. The method of claim 13, wherein monitoring a flexible surface includes sensing one of a contact, a movement, a predefined temperature, a light, and a predefined audible sound.

18. The method of claim 12, wherein detecting a first interaction on the flexible surface includes sensing a depression by a pointed object on the flexible surface.

19. The method of claim 12, wherein determining a first location on the flexible surface includes identifying physical coordinates of a contact point with respect to the flexible surface.

20. The method of claim 12, wherein activating the first haptic actuator in response to the first distance further includes generating a haptic wave traveling through medium of the flexible surface to generate haptic feedback at the first location.

21. A method of providing haptic feedback, comprising:
detecting a first interaction at a first location on a flexible surface;
generating a plurality of haptic waveform pulses with a first plurality of actuators to provide haptic feedback to the first location on the flexible surface in response to the detecting; and
generating a plurality of canceling haptic waveform pulses with a second plurality of actuators to minimize unwanted haptic effects on the flexible surface at locations other than the first location.

22. The method of claim 21, further comprising
calculating a first distance from at least one of the first plurality of haptic actuators to the first location prior to said generating the plurality of haptic waveform pulses to determine which of the first plurality of actuators to actuate; and
calculating a second distance from at least one of the second plurality of haptic actuators to the first location prior to said generating the plurality of canceling haptic waveform pulses to determine which of the second plurality of actuators to actuate.

* * * * *